(12) United States Patent
Lynn (10) Patent No.: US 12,538,870 B2
(45) Date of Patent: Feb. 3, 2026

(54) ELECTRIC MOWER

(71) Applicant: KUBOTA CORPORATION, Osaka (JP)

(72) Inventor: Jordan Lynn, Gainesville, GA (US)

(73) Assignee: KUBOTA CORPORATION, Osaka (JP)

( * ) Notice: Subject to any disclaimer, the term of this patent is extended or adjusted under 35 U.S.C. 154(b) by 391 days.

(21) Appl. No.: 18/213,300

(22) Filed: Jun. 23, 2023

(65) Prior Publication Data

US 2024/0423132 A1    Dec. 26, 2024

(51) Int. Cl.
| | |
|---|---|
| *A01D 34/00* | (2006.01) |
| *A01D 34/66* | (2006.01) |
| *A01D 34/76* | (2006.01) |
| *A01D 69/02* | (2006.01) |
| *A01D 75/18* | (2006.01) |

(52) U.S. Cl.
CPC .......... *A01D 69/02* (2013.01); *A01D 34/006* (2013.01); *A01D 34/66* (2013.01); *A01D 34/76* (2013.01); *A01D 75/187* (2013.01)

(58) Field of Classification Search
CPC ...... A01D 34/006; A01D 34/66; A01D 34/76; A01D 34/78; A01D 69/02; A01D 75/187; B60L 1/003
See application file for complete search history.

(56) References Cited

U.S. PATENT DOCUMENTS

| | | | |
|---|---|---|---|
| 2016/0183451 A1* | 6/2016 | Conrad ................. | A01D 34/66 56/10.2 R |
| 2019/0124837 A1* | 5/2019 | Ito .......................... | A01D 69/02 |
| 2022/0304226 A1* | 9/2022 | Yang ...................... | A01D 34/78 |
| 2022/0408638 A1 | 12/2022 | Ito et al. | |
| 2024/0072616 A1* | 2/2024 | Moturu .................. | B60L 1/003 |
| 2025/0098576 A1* | 3/2025 | Wei ........................ | A01D 34/78 |

* cited by examiner

*Primary Examiner* — Joseph M Rocca
*Assistant Examiner* — Robert E Pezzuto
(74) *Attorney, Agent, or Firm* — GREENBLUM AND BERNSTEIN, P.L.C.

(57) ABSTRACT

An electric mower includes: a body; a battery on the body; at least one motor drivable on electric power from the battery; a mower unit drivable on motive power from the at least one motor; at least one controller configured to control the at least one motor; and a support member disposed below the battery and fixed to the body, the at least one controller being fixed to the support member.

5 Claims, 6 Drawing Sheets

ELECTRIC MOWER

FIELD OF THE INVENTION

The present invention relates to an electric mower including a mower unit drivable by a motor.

BACKGROUND OF THE INVENTION

An electric mower includes wheels and a mower unit. The wheels are drivable on electric power from a battery for the electric mower to travel. The mower unit is also drivable on electric power from the battery to cut grass. As disclosed in US2022408638A1, an electric mower includes a battery at a back portion of its body.

There has been a demand for a battery with a large capacity for improvement of the efficiency in the mowing operation. This has in turn led to a need to place a large-sized battery on the body efficiently and mount the battery on the body accurately, that is, a need to efficiently and accurately mount components such as a battery on the body.

The present invention has an object of providing an electric mower including components mounted on its body efficiently and accurately.

SUMMARY OF THE INVENTION

An electric mower of the present invention includes: a body: a battery on the body; at least one motor drivable on electric power from the battery; a mower unit drivable on motive power from the at least one motor; at least one controller configured to control the at least one motor; and a support member disposed below the battery and fixed to the body, the at least one controller being fixed to the support member.

The above configuration allows the controller to be in a space below the battery. This allows the controller to be placed regardless of how large the battery is.

The above configuration also includes a support member to which the controller is fixed. This allows the controller to be detached independently of the battery, and facilitates, for example, detaching the controller for maintenance or the like.

The electric mower may preferably be configured such that the support member includes an opening through which a lower face of the at least one controller is exposed downward.

The electric mower may preferably be configured such that the at least one controller includes, at the lower face, a heat sink section exposed downward through the opening.

The electric mower may preferably include: at least one plate supporting the battery from below, wherein the support member is coupled to the at least one plate.

The electric mower may preferably be configured such that the at least one plate includes a plurality of plates, and the supporting member is coupled to two of the plurality of plates.

The electric mower may preferably be configured such that the mower unit includes: at least one mower blade; and a mower cover covering the at least one mower blade from above, wherein the at least one controller does not coincide with the mower cover as viewed in an up-down direction.

The electric mower may preferably be configured such that the at least one mower blade includes a plurality of mower blades, the at least one motor includes a plurality of motors, the at least one controller includes a plurality of controllers, the mower blades, the motors, and the controllers form a plurality of combinations, and the controllers are arranged in a direction of a width of the electric mower.

The electric mower may preferably include: a drive wheel; and a drive wheel motor configured to drive the drive wheel, wherein the at least one controller is forward of the drive wheel motor.

BRIEF DESCRIPTION OF THE DRAWINGS

The present disclosure is further described in the detail description which follows, in reference to the noted plurality of drawings by way of non-limiting examples of exemplary embodiments of the present disclosure, in which like reference numerals represent similar parts throughout the several views of the drawings, and wherein.

DETAILED DESCRIPTION OF THE INVENTION

The description below deals with an embodiment of the present invention with reference to drawings. Unless otherwise specified, the description below uses terms such as "front" and "forward" to refer to the direction indicated with arrow F in the drawings, terms such as "back" and "backward" to refer to the direction indicated with arrow B in the drawings, terms such as "left" and "leftward" to refer to the direction indicated with arrow L in the drawings, terms such as "right" and "rightward" to refer to the direction indicated with arrow R in the drawings, terms such as "above" and "upward" to refer to the direction indicated with arrow U in the drawings, and terms such as "below" and "downward" to refer to the direction indicated with arrow D in the drawings.

Overall Configuration of Electric Mower

Figure 1:
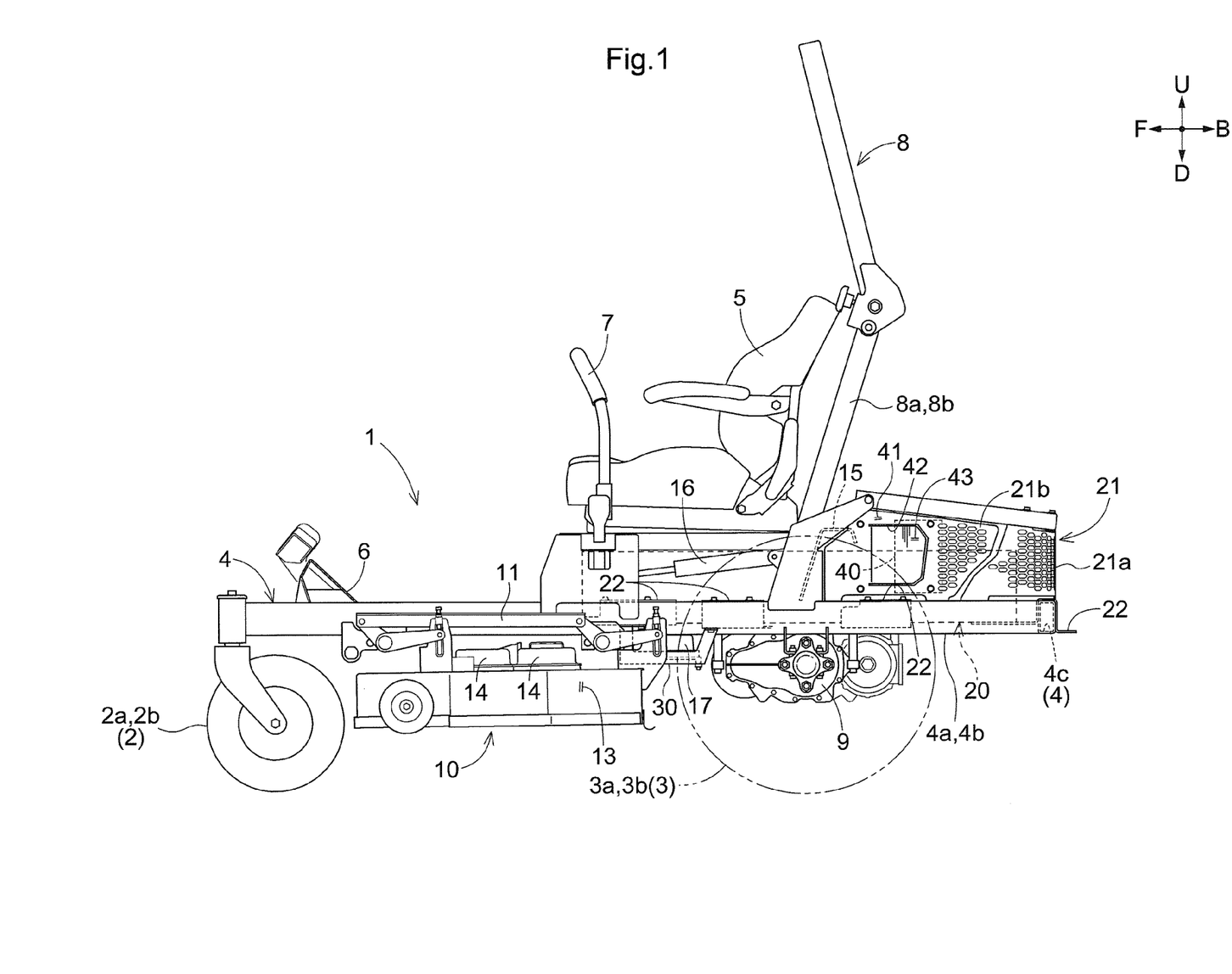
FIG. 1 is a side view of an electric mower.
Figure 2:
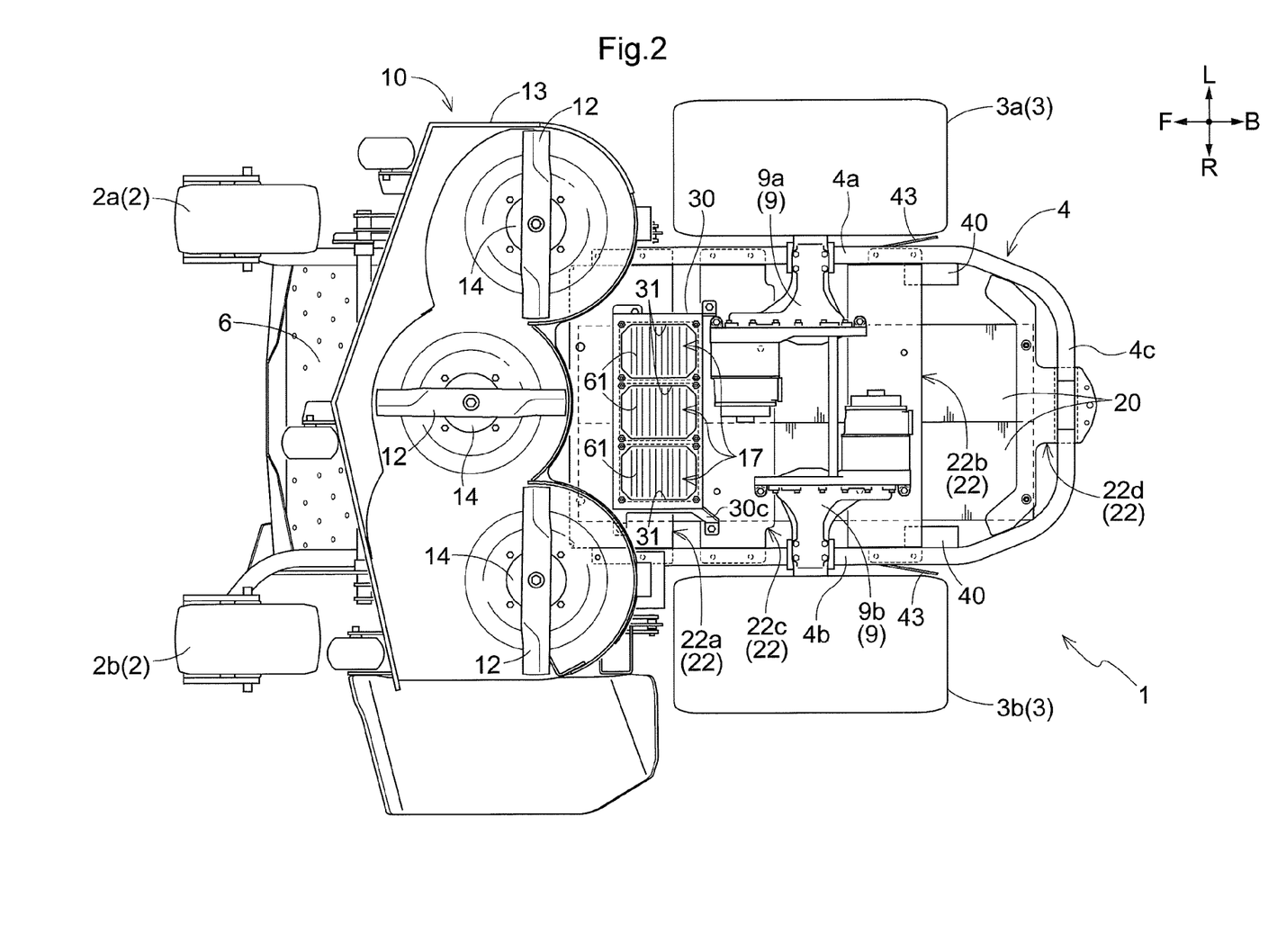
FIG. 2 is a bottom view of an electric mower.

The description below deals with an electric mower as an embodiment. As illustrated in FIGS. 1 and 2, the electric mower is of a riding type, and includes a body 1 provided with front wheels 2, drive wheels 3, and a body frame 4. The front wheels 2 are namely a left front wheel 2a and a right front wheel 2b each in the form of a rotatable caster. The drive wheels 3 are namely a left rear wheel 3a and a right rear wheel 3b. The body frame 4 is supported by the front wheels 2 and the drive wheels 3 on the ground. The body frame 4 includes a left frame section 4a, a right frame section 4b, and a back end section 4c coupling a back end portion of the left frame section 4a to a back end portion of the right frame section 4b.

The body 1 is provided with a driver's seat 5 on which an operator is able to sit. The body 1 is provided with a floor plate 6 in front of the driver's seat 5 on which floor plate 6 the operator is able to place their feet. The body 1 is provided with left and right control levers 7 to the left and right of the driver's seat 5. As illustrated in FIG. 2, the body 1 is provided with two drive wheel motors 9 configured to drive the respective drive wheels 3, namely, a motor 9a configured to drive the left rear wheel 3a and a motor 9b configured to drive the right rear wheel 3b. The operator is able to operate the control levers 7 to change the respective rotation speeds of the left rear wheel 3a and the right rear wheel 3b.

Figure 3:
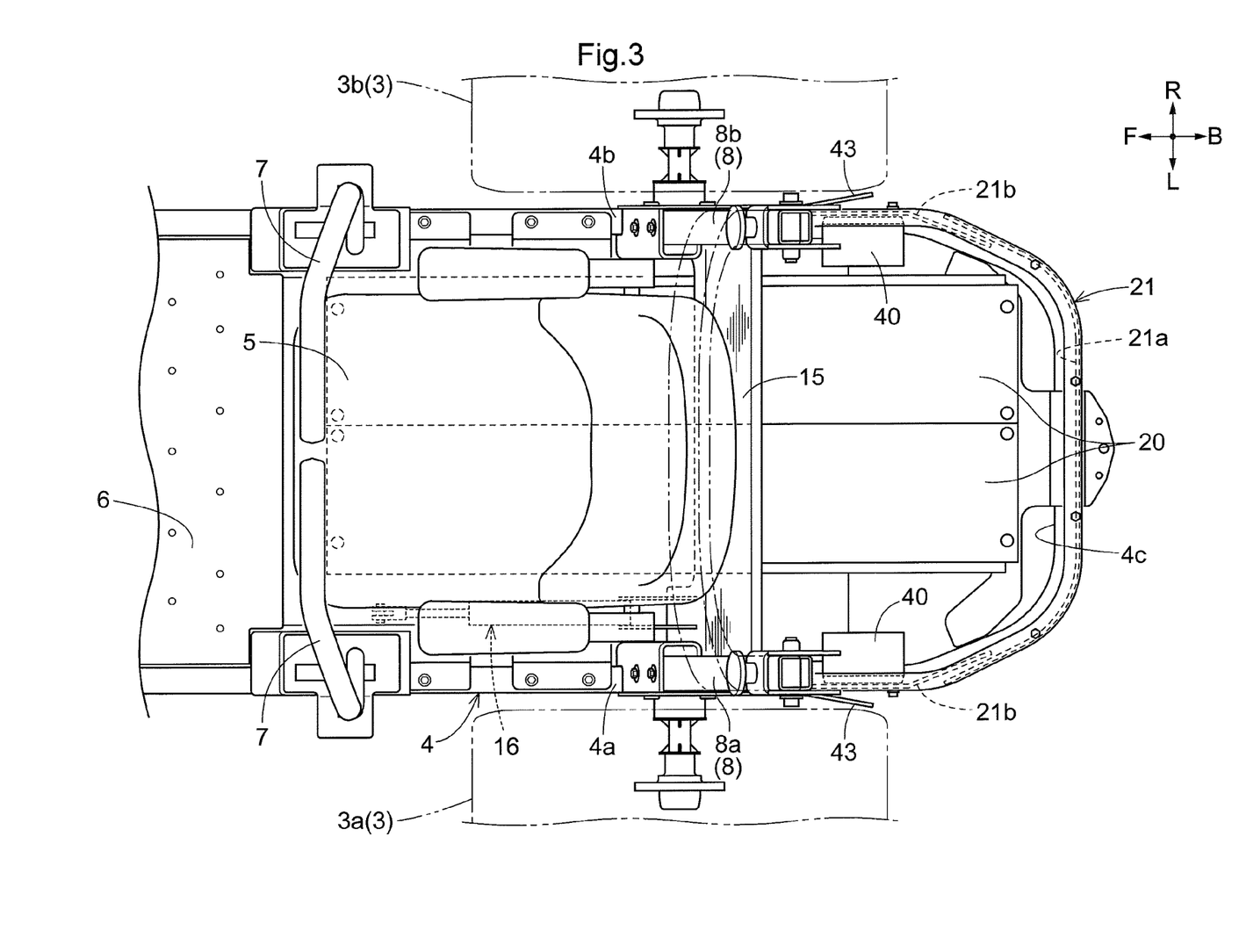
FIG. 3 is a plan view of a back portion of an electric mower.

As illustrated in FIGS. 1 and 3, the electric mower includes a rollover protection structure (ROPS) 8 disposed backward of the driver's seat 5 and fixed to the body frame 4. The ROPS 8 includes a left vertical section 8a fixed to the left frame section 4a, a right vertical section 8b fixed to the right frame section 4b, and a cross member 15 coupling a lower portion of the right vertical section 8b to a lower portion of the left vertical section 8a.

As illustrated in FIGS. 1 and 3, the electric mower includes a battery 20 in a space extending from respective back end portions of the left frame section 4a and the right frame section 4b to below the driver's seat 5. As illustrated in FIG. 3, the electric mower includes a cover 21 covering at least a portion of the battery 20. The cover 21 includes a back wall 21a backward of the battery 20 and a left side wall 21b and a right side wall 21b each extending forward from the back wall 21a. The battery 20 is between the left frame section 4a and the right frame section 4b in a plan view.

The battery 20 is disposed toward a first side (for the present embodiment, the right side) in the left-right direction of the electric mower between the left frame section 4a and the right frame section 4b. The electric mower includes a holder device 16 disposed between the battery 20 and the body frame 4 on a second side (for the present embodiment, the left side) in the left-right direction and configured to temporarily hold a mower unit 10 at its lifted position.

How Battery Is Supported

Figure 4:
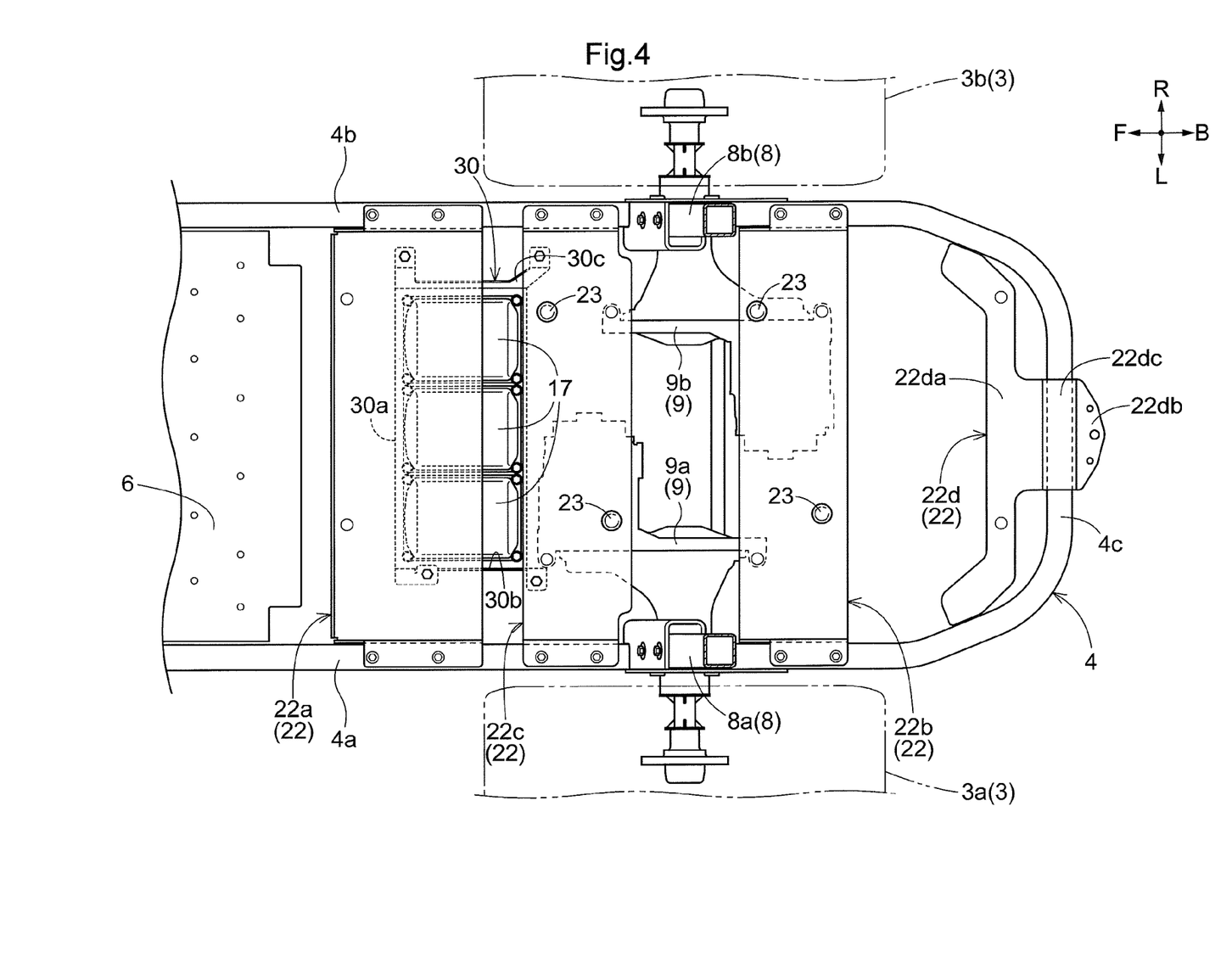
FIG. 4 is a view of elements supporting a battery from below.
Figure 5:
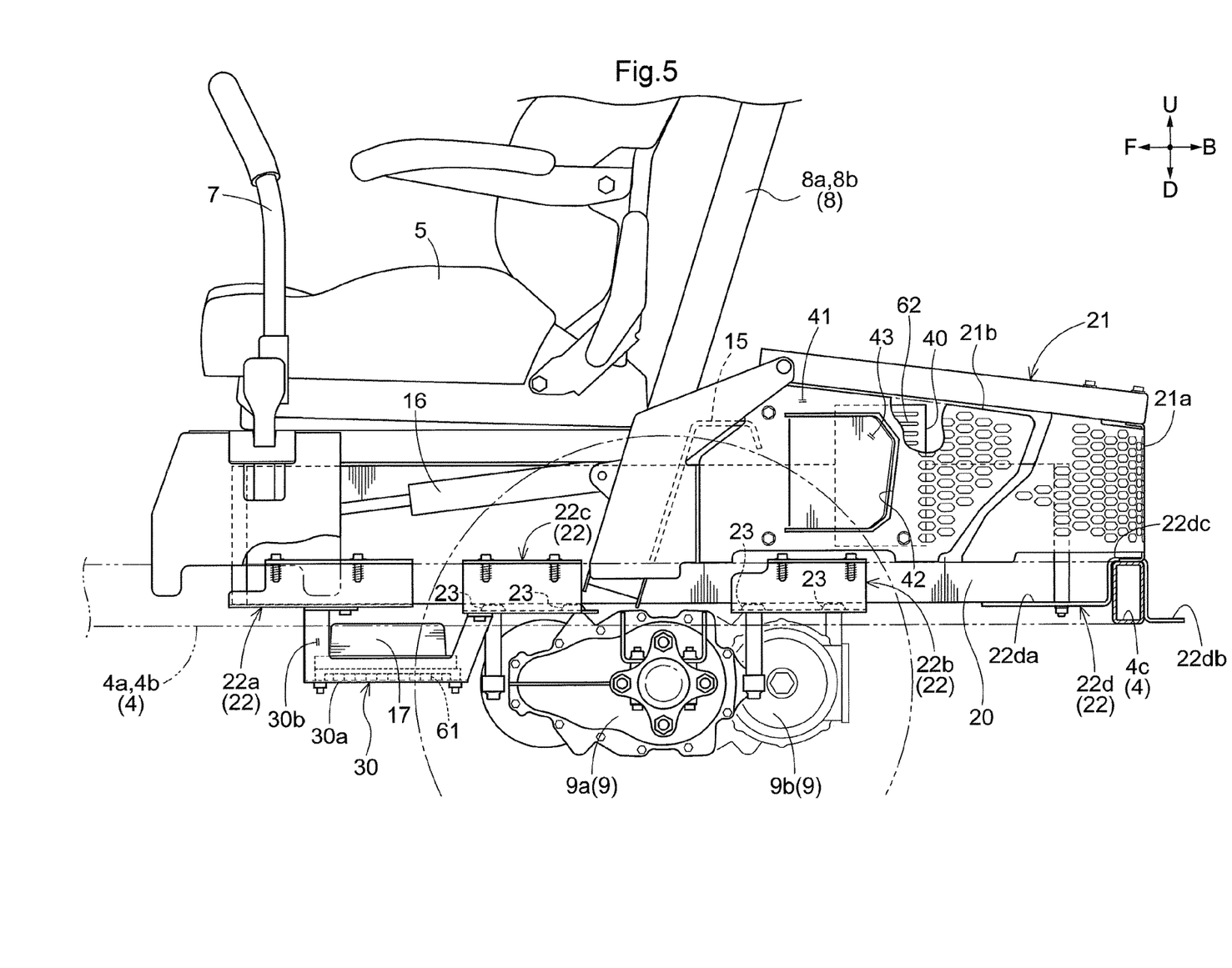
FIG. 5 is a side view of elements supporting a battery and a controller for a work motor and of a cover.

The electric mower includes two or more plates 22 supporting the battery 20 from below. As illustrated in FIGS. 4 and 5, the plates 22 includes a first plate 22a, a second plate 22b, a third plate 22c, and a fourth plate 22d. The plates 22 are supported by the body frame 4 and spaced from one another in the front-back direction of the electric mower. The battery 20 is bolted to the plates 22. The battery 20 is surrounded by the cross member 15 and the plates 22.

The first plate 22a is rectangular. The first plate 22a is forward of the position at which the ROPS 8 is coupled to the body frame 4, and supports a front end portion of the battery 20. The first plate 22a is bolted to the respective upper faces of the left frame section 4a and the right frame section 4b to be supported by the body frame 4.

The second plate 22b is rectangular. The second plate 22b is backward of the position at which the ROPS 8 is coupled to the body frame 4. The second plate 22b is bolted to the respective upper faces of the left frame section 4a and the right frame section 4b to be supported by the body frame 4.

The second plate 22b has an upper face provided with two elastic members 23 each made of rubber. The battery 20 is fixed to the second plate 22b with the elastic members 23 in-between. One of the elastic members 23 is on a front right portion of the second plate 22b, whereas the other elastic member 23 is on a back left portion of the second plate 22b.

The third plate 22c is rectangular. The third plate 22c is between the first plate 22a and the second plate 22b. The third plate 22c is bolted to the respective upper faces of the left frame section 4a and the right frame section 4b to be supported by the body frame 4.

Similarly to the second plate 22b, the third plate 22c has an upper face provided with two elastic members 23 each made of rubber. The battery 20 is fixed to the third plate 22c with the elastic members 23 in-between. One of the elastic members 23 is on a front right portion of the third plate 22c, whereas the other elastic member 23 is on a back left portion of the third plate 22c.

The fourth plate 22d is at a back end portion of the body frame 4. The fourth plate 22d is bolted to the upper face of the back end section 4c to be supported by the body frame 4.

The fourth plate 22d includes a battery support section 22da extending forward from the back end section 4c, a hitch support section 22db extending backward from the back end section 4c, and an intermediate section 22dc disposed between the battery support section 22da and the hitch support section 22db and over the back end section 4c. The battery support section 22da extends laterally as well to reach the left frame section 4a and the right frame section 4b. The battery support section 22da is under a back end portion of the battery 20.

Configuration of Mower Unit

The electric mower includes a mower unit 10 between the front wheels 2 and the drive wheels 3 and below the body 1. The mower unit 10 is suspended from the body 1 with use of a lifting and lowering link mechanism 11 in such a manner as to be capable of being lifted and lowered. The mower unit 10 is below the battery 20.

As illustrated in FIG. 2, the mower unit 10 includes three mower blades 12 and a mower cover 13 covering the mower blades 12 from above. The mower unit 10 includes three motors 14 provided for the respective mower blades 12 and drivable on electric power from the battery 20. The mower unit 10 is drivable by the motors 14.

The mower unit 10 includes three controllers 17 configured to control the respective motors 14. The controllers 17 for the present embodiment are each an inverter configured to convert electric current from the battery 20 into a three-phase alternating current with a predetermined frequency and supply the alternating current to the corresponding motor 14, which is thereby driven in accordance with the frequency. The battery 20, the controllers 17, and the motors 14 are connected to one another with use of a harness or the like (not illustrated in the drawings).

The mower unit 10 includes two or more (for the present embodiment, three) combinations of mower blades 12, motors 14, and controllers 17. The controllers 17 are arranged in the direction of the width of the electric mower, and are fixed to the body 1 with use of a support member 30.

How Controllers Are Supported

Figure 6:
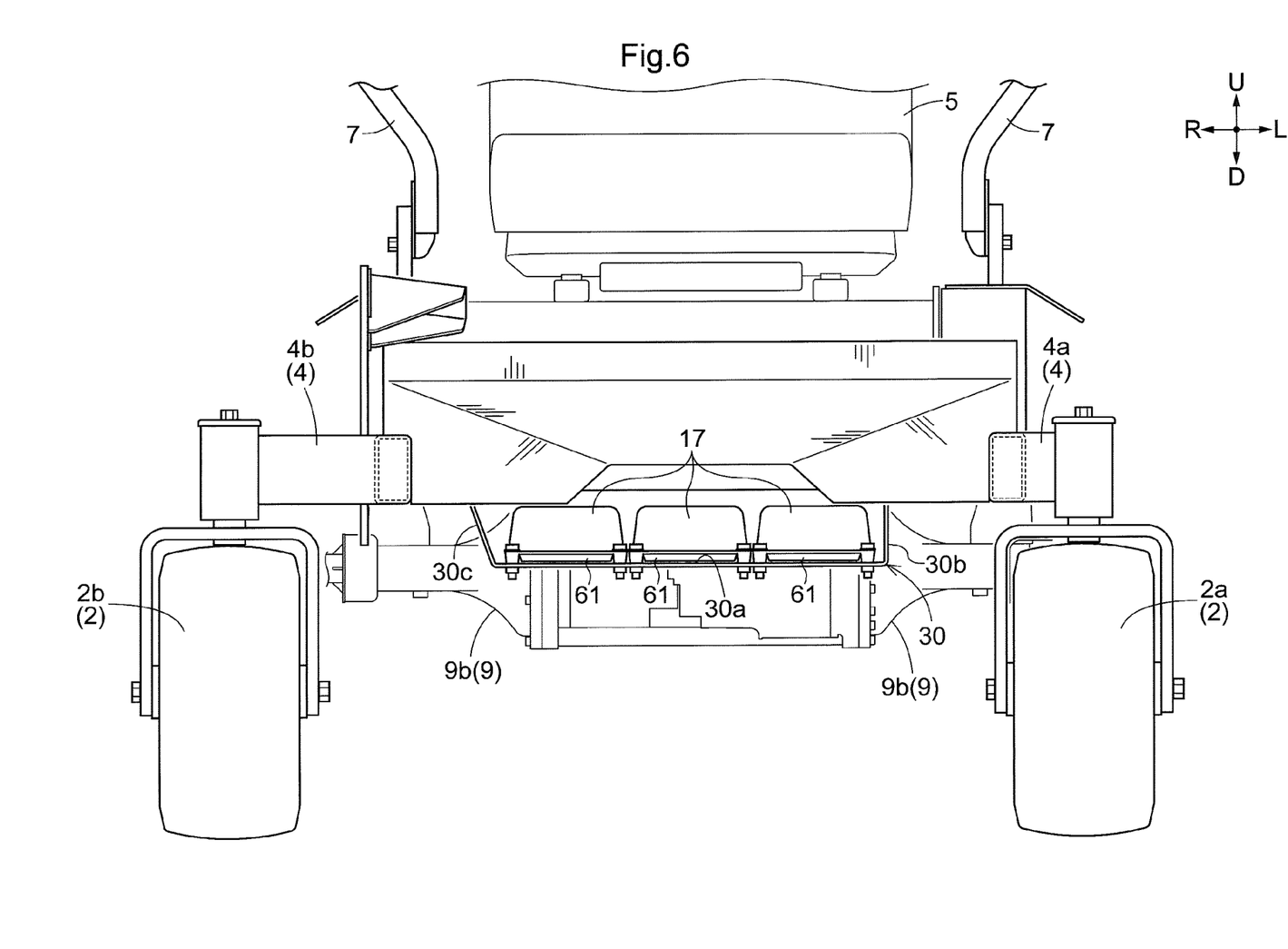
FIG. 6 is a front view of elements supporting controllers for work motors.

As illustrated in FIG. 5, the support member 30 is disposed below the battery 20 and fixed to the body 1. As illustrated in FIG. 6, the support member 30 includes a support section 30a, a left wall 30b, and a right wall 30c. The support section 30a supports the controllers 17.

As illustrated in FIG. 2, the support section 30a has three openings 31 through which the respective lower faces of the controllers 17 are exposed downward. In a case where the controllers 17 each include a heat sink section 61 for discharging heat at a lower face thereof, exposing the heat sink section 61 downward through the corresponding opening 31 cools the controller 17 efficiently. The controllers 17 are forward of the drive wheel motors 9, which are configured to drive the respective drive wheels 3, and do not coincide with the mower cover 13 as viewed in the up-down direction.

As illustrated in FIG. 5, the left wall 30b extends upward from the left end of the support section 30a. The left wall 30b includes a front portion coupled to the first plate 22a and a back portion coupled to the third plate 22c.

As illustrated in FIG. 2, the right wall 30c is similar to the left wall 30b; it includes a front portion coupled to the first plate 22a and a back portion coupled to the third plate 22c. The support member 30 is thus coupled to two plates 22. As illustrated in FIG. 6, the left wall 30*b* extends upward substantially vertically, whereas the right wall 30*c* is so inclined that a portion farther upward is farther to the right. The support member 30 includes no front wall or back wall, and is open on the front side and the back side.

Configurations of Motors for Driving Drive Wheels and Controller

As illustrated in FIG. 2, the drive wheel motors 9, namely the motors 9*a* and 9*b*, are disposed below the battery 20 and fixed to the second plate 22*b* and the third plate 22*c*. The drive wheel motors 9 are each drivable on electric power from the battery 20.

The electric mower includes two controllers 40 configured to control the respective motors 9*a* and 9*b*. In other words, the drive wheels 3 (namely, the left rear wheel 3*a* and the right rear wheel 3*b*), the drive wheel motors 9 (namely, the motor 9*a* and the motor 9*b*), and the controllers 40 form two combinations. The controllers 40 for the present embodiment are each an inverter configured to convert electric current from the battery 20 into a three-phase alternating current with a predetermined frequency and supply the alternating current to the corresponding one of the motors 9*a* and 9*b*, which is thereby driven in accordance with the frequency. The battery 20, the controllers 40, and the drive wheel motors 9 are connected to one another with use of a harness or the like (not illustrated in the drawings).

As illustrated in FIG. 3, the controllers 40 are between the side walls 21*b* of the cover 21 and on respective opposite sides in the direction of the width of the electric mower. The controllers 40 are each between the battery 20 and the corresponding one of the side walls 21*b*. The controllers 40 are each backward of a lower end portion of the ROPS 8.

As illustrated in FIG. 5, the side walls 21*b* are each a plate member 41 positioned in correspondence with the corresponding one of the controllers 40. The plate member 41 has an opening 42 for cooling the controller 40, and includes a dust preventer plate 43 configured to prevent suction of dust through the opening 42. The opening 42 has (i) a front end forward of the front end of the controller 40 and (ii) a back end backward of the front end of the controller 40.

Forming the opening 42 and the dust preventer plate 43 involves cutting a slit at a central portion of the plate member 41 in the shape of a substantial U turned by 90 degrees toward the front side and bending the slit portion at the straight line connecting the upper ends of the U. The opening 42 and the dust preventer plate 43 are thus integral with the plate member 41. The dust preventer plate 43 is connected to the front edge of the opening 42 and so inclined that a portion farther backward is farther apart from the opening 42 (see FIG. 2).

In a case where the controllers 40 each include a heat sink section 62 for discharging heat, the heat sink section 62 faces the opening 42 and is exposed through the opening 42. This cools the controller 40 efficiently. The holder device 16, which is configured to temporarily hold the mower unit 10 at its lifted position, is forward of that one of the plurality of (for the present embodiment, two) controllers 40 which is on the left.

Alternative Embodiments

The description below deals with example alternatives to the embodiment described above.

(1) The embodiment described above under "Detailed Description of the Invention" is an example including a ROPS 8. The present invention is, however, not limited to such a configuration, and may omit the ROPS 8.

(2) The embodiment described above under "Detailed Description of the Invention" is an example including four plates as the two or more plates 22. The present invention is, however, not limited to such a configuration, and may include two or three plates or five or more plates as the two or more plates 22.

(3) The embodiment described above under "Detailed Description of the Invention" is an example in which the second plate 22*b* and the third plate 22*c* are each provided with elastic members 23. The present invention is, however, not limited to such a configuration, and may be configured such that the first plate 22*a* and the fourth plate 22*d* are each provided with elastic members 23 or that no plates are provided with elastic members 23.

(4) The embodiment described above under "Detailed Description of the Invention" is an example in which the fourth plate 22*d* includes a battery support section 22*da*, a hitch support section 22*db*, and an intermediate section 22*dc*. The present invention is, however, not limited to such a configuration, and may be configured such that the fourth plate 22*d* is rectangular similarly to the other plates such as the first plate 22*a*. The fourth plate 22*d* may, in that case, extend from the left frame section 4*a* to the right frame section 4*b*.

(5) The embodiment described above under "Detailed Description of the Invention" is an example in which the ROPS 8 includes a cross member 15. The present invention is, however, not limited to such a configuration, and may be configured such that the ROPS 8 does not include a cross member 15.

(6) The embodiment described above under "Detailed Description of the Invention" is an example including a holder device 16. The present invention is, however, not limited to such a configuration, and may omit the holder device 16.

(7) The embodiment described above under "Detailed Description of the Invention" is an example including a dust preventer plate 43 at the opening 42. The present invention is, however, not limited to such a configuration, and may omit the dust preventer plate 43.

(8) The embodiment described above under "Detailed Description of the Invention" is an example in which the dust preventer plate 43 is so inclined that a portion farther backward is farther apart from the opening 42. The present invention is, however, not limited to such a configuration, and may be configured such that the dust preventer plate 43 is, for instance, parallel to the opening 42.

(9) The embodiment described above under "Detailed Description of the Invention" is an example in which the controllers 40 are each backward of a lower end portion of the ROPS 8 and in which the opening 42 has (i) a front end forward of the front end of the controller 40 and (ii) a back end backward of the front end of the controller 40. The present invention is, however, not limited to such a configuration, and may be configured, for instance, such that the controllers 40 are each forward of a lower end portion of the ROPS 8 and that the opening 42 has a front end back ward of the back end of the controller 40.

(10) The embodiment described above under "Detailed Description of the Invention" is an example including two combinations of drive wheels 3, drive wheel motors 9, and controllers 40. The present invention is, however, not limited to such a configuration, and may include one combination of the above or three or more combinations of the above.

(11) The embodiment described above under "Detailed Description of the Invention" is an example in which the support member 30 has openings 31. The present invention is, however, not limited to such a configuration, and may be configured such that the support member 30 has no openings 31.

(12) The embodiment described above under "Detailed Description of the Invention" is an example in which the controllers 17 are arranged in the direction of the width of the electric mower. The present invention is, however, not limited to such a configuration, and may be configured such that the controllers 17 are arranged otherwise such as in the direction of the length of the electric mower.

(13) The embodiment described above under "Detailed Description of the Invention" is an example in which the controllers 17 and the controllers 40 are each an inverter. The present invention is, however, not limited to such a configuration, and may be configured such that the controllers 17 and the controllers 40 are each another electric current converter.

The arrangements disclosed for the above embodiments (including the alternative embodiments; hereinafter the same applies) may each be combined with an arrangement disclosed for another embodiment, as long as such a combination does not cause a contradiction. Further, the embodiments disclosed in the present specification are mere examples. The present invention is not limited to those embodiments, and may be altered as appropriate, as long as such an alteration does not result in a failure to attain an object of the present invention.

REFERENCE SIGNS LIST

1 Body
10 Mower unit
12 Mower blade
13 Mower cover
14 Motor
15 Cross member
16 Holder device
17 Controller
17*a* Heat sink section
20 Battery
22 Plate
30 Support member
31 Opening

The invention claimed is:

1. An electric mower, comprising:
a body;
a battery on the body;
at least one plate supporting the battery from below;
at least one motor drivable on electric power from the battery;
a mower unit drivable on motive power from the at least one motor;
at least one controller configured to control the at least one motor; and
a support member disposed below the battery and fixed to the body,
the at least one controller being fixed to the support member;
wherein the support member is coupled to the at least one plate;
the support member includes an opening through which a lower face of the at least one controller is exposed downward;
wherein the mower unit includes:
at least one mower blade; and
a mower cover covering the at least one mower blade from above,
wherein the at least one controller does not coincide with the mower cover as viewed in an up-down direction.

2. The electric mower according to claim 1, wherein the at least one controller includes, at the lower face, a heat sink section exposed downward through the opening.

3. The electric mower according to claim 1, wherein the at least one plate includes a plurality of plates, and the supporting member is coupled to two of the plurality of plates.

4. The electric mower according to claim 1, wherein the at least one mower blade includes a plurality of mower blades,
the at least one motor includes a plurality of motors,
the at least one controller includes a plurality of controllers,
the mower blades, the motors, and the controllers form a plurality of combinations, and
the controllers are arranged in a direction of a width of the electric mower.

5. The electric mower according to claim 1, further comprising:
a drive wheel; and
a drive wheel motor configured to drive the drive wheel,
wherein the at least one controller is forward of the drive wheel motor.

* * * * *